Oct. 30, 1928.
A. W. BURWELL
1,689,858
PROCESS FOR THE PRODUCTION OF HYDROGEN OF GREAT PURITY
Filed Aug. 22, 1927
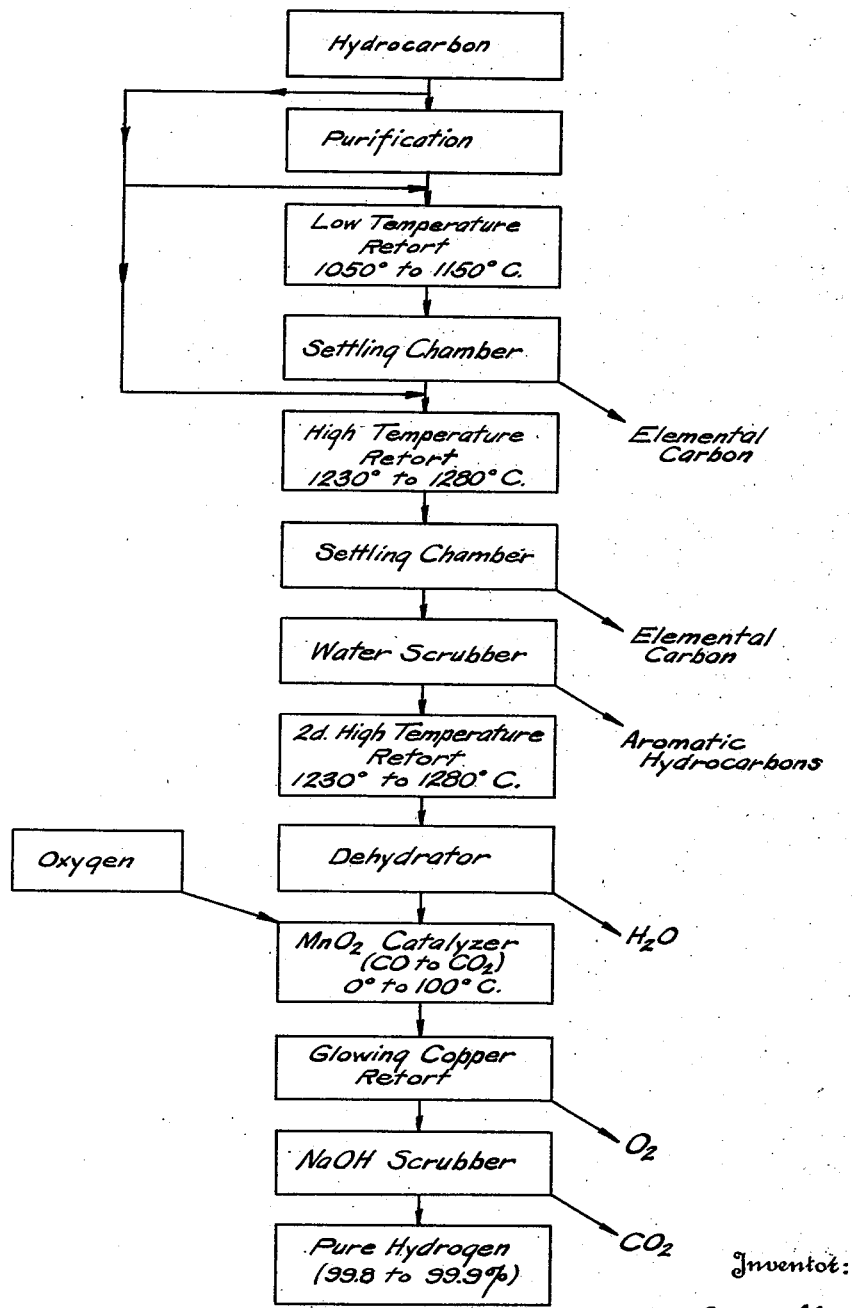

Patented Oct. 30, 1928.

1,689,858

UNITED STATES PATENT OFFICE.

ARTHUR W. BURWELL, OF NIAGARA FALLS, NEW YORK, ASSIGNOR TO ALOX CHEMICAL CORPORATION, OF NEW YORK, N. Y., A CORPORATION OF NEW YORK.

PROCESS FOR THE PRODUCTION OF HYDROGEN OF GREAT PURITY.

Application filed August 22, 1927. Serial No. 214,749.

This invention relates to processes for the production of hydrogen of great purity from hydrocarbons such as coal, petroleum oil, fuel oil, natural gas, casing head gas and the like.

In my co-pending application Serial No. 56,772, filed Sept. 16, 1925, I have described a process suitable for the production of commercially pure hydrogen, which comprises passing a stream of gas comprising a hydrocarbon into contact with a solid body heated to a temperature of 950° to 1000° C., separating carbon from the resulting gases, passing the separated gases into contact with a second solid body heated to about 1140° to 1170° C., catalytically converting the carbon monoxide content of the gas into a low-molecular weight hydrocarbon and water vapor, thermally decomposing the low-molecular weight hydrocarbon, and removing water vapor from the final gaseous product,—the whole operation being conducted under the substantial exclusion of oxygen and oxygen compounds.

An object of the present invention is to provide a process for the production of a hydrogen product of a degree of purity heretofore not attainable in a hydrogen product obtained through the decomposition of hydrocarbons; in particular, the object of the invention is to provide methods of purifying an impure gaseous hydrogen product such as that obtainable by carrying out the thermal decomposition steps of the process disclosed in my application Serial No. 56,772.

It has now been found that the separation of elemental carbon and of normally present impurities from the commercial hydrogen product obtained by the thermal decomposition of hydrocarbon material,—such as, for example, coal, petroleum oil, fuel oil, natural gas, casing head gas and the like,— may be effected substantially completely,— by recourse to a relatively simple purification procedure,—whereby to obtain a gaseous hydrogen product containing from about 99.8% to about 99.9% hydrogen. My complete process in its essential steps comprises: initially producing a hydrogen product of commercial purity by subjecting a hydrocarbon material, under exclusion of oxygen and oxygen compounds, to thermal decomposition treatment,—preferably, to thermal decomposition treatment in a plurality of stages,—in such manner and under such conditions that the resulting decomposition product consists essentially of hydrogen and elemental carbon, with relatively very small amounts of aromatic hydrocarbons, carbon monoxide and hydrocarbons of the methane type, and separating the elemental carbon from the decomposition products; the resulting commercial hydrogen product is then purified by passing the commercial hydrogen product into contact with water,—whereby to remove any aromatic hydrocarbons from said commercial hydrogen product, and to saturate the latter with water vapor,—subjecting the residual, water-saturated, aromatic hydrocarbons-free, commercial hydrogen product thus obtained to a thermal decomposition treatment at temperatures of from about 1230° to about 1280° C. for the purpose of converting the methane-type-hydrocarbons content of the residual commercial hydrogen product to carbon monoxide, completely removing undecomposed water vapor from the resulting gaseous mixture, converting the carbon monoxide content of the resulting dehydrated gaseous mixture to carbon dioxide by admixing therewith pure oxygen in amount in excess of that theoretically required for the reaction $$2CO + O_2 = 2CO_2$$

and passing the free oxygen-containing gaseous mixture over an oxidizing catalyst,— preferably, over a manganese dioxide catalyst at temperatures from about 0° to about 100° C.,—removing unreacted oxygen from the resulting gaseous reaction mixture by contacting the same with glowing copper, and finally separating the carbon dioxide content of the gaseous mixture by contacting the same with a solution of caustic alkali.

The accompanying drawing is a self-explanatory schematic representation of the process according to the present invention.

For the production of the aforesaid commercial hydrogen product I subject to thermal decomposition treatment, at temperatures above about 1000° C. and below about 1300° C., any suitable hydrocarbon material such as coal, petroleum oil, fuel, natural gas, casing head gas and the like, preferably, hydrocarbon material which is free of oxygen and oxygen compounds. While it is commercially possible to effect the desired thermal decomposition treatment in one operation (i. e., by heating the hydrocarbon, in gaseous or vapor phase, to the desired temperature in a single retort), my preferred procedure involves effecting the decomposition by stages,—that is, initially subjecting the hydrocarbon to partial decomposition by the employment of relatively lower temperatures (i. e., temperatures of from about 1050° to about 1150° C.), passing the resulting stream comprising elemental carbon and the gaseous products of this partial decomposition through a suitable settling chamber for the removal therefrom of the elemental carbon, and subjecting the stream of separated gases to heat treatment at temperatures relatively higher than those employed for the initial thermal decomposition treatment,—i. e., temperatures of from about 1230° to about 1280° C. The gaseous mixture, obtained by separating elemental carbon from the decomposition products resulting from this second, high temperature, heat treatment, is a commercial hydrogen product containing from 98% to 99.5% hydrogen, the remaining gases being hydrocarbons of the methane type, aromatic hydrocarbons and (since absolutely complete exclusion of oxygen and oxygen compounds from the aforesaid operations is almost a technical impossibility) usually some carbon monoxide.

As has been indicated heretofore, it is understood to be an obvious technical advantage to preliminarily subject the hydrocarbon material,—prior to vaporization,—to a suitable purification treatment for the removal therefrom of oxygen and oxygen compounds, and the present invention as described embraces the conception of using, as the starting material for the process, hydrocarbon material which has been so purified. Thus, in the case of crude petroleum oil, I prefer to purify the oil by treating it with sulfuric acid of about 66° Bé.,—about five pounds of acid to a barrel of oil,—then washing with water and finally with dilute alkali, and finally drying the purified oil by heating.

The above-described commercial hydrogen product is simultaneously freed of its content of aromatic hydrocarbons, and saturated with water vapor, by passing the said commercial hydrogen product into contact with water in any suitable manner such as, for example, that employed in a counter-current washing and scrubbing device.

The residual, water-saturated, aromatic hydrocarbons - free, commercial hydrogen product thus obtained is then subjected to a thermal decomposition treatment at temperatures of from about 1230° to about 1280° C., for the purpose of converting the methane-type-hydrocarbons content of said product to carbon monoxide according to the type reaction:

$$CH_4 + n.H_2O = 3H_2 + CO + (n-1).H_2O$$

Advantageously, this thermal decomposition treatment may be effected by passing a stream of said product into a retort which is set into the same furnace into which is set the retort for the second, high temperature, heat treatment of the vaporized starting material.

I have found, further, that the last traces of combined carbon in the commercial hydrogen product may be converted to hydrogen and carbon monoxide by a modified procedure involving the use of a nickel-walled retort for the second-high temperature thermal decomposition treatment of the partially decomposed starting material, and the provision of fluid heating means,—for said nickel-walled retort,—having an oxidizing effect; e. g. heating gases containing free oxygen. In those cases where a nickel-walled retort is used, and where the heating fluid has the aforesaid oxidizing effect, it has been found that, under the normal working conditions, oxygen constantly soaks through the nickel wall of the retort and reacts with the products undergoing thermal decomposition, whereby to effect the conversion of the aromatic hydrocarbons and of the methane-type hydrocarbons to carbon monoxide.

The foregoing partial purification operations having effected the removal of aromatic hydrocarbons and methane-type-hydrocarbons from the commercial hydrogen product, there remain for subsequent purification steps only the removal of water vapor and of carbon monoxide.

The water vapor content of the partially purified hydrogen product is removed by any procedure susceptible to the substantially complete dehydration of the hot gases,—for example, by passing the gaseous mixture containing the water vapor over or through a suitable dehydrating agent such as silica gel, calcium chloride, sulfuric acid or the like,—it being necessary to the success of the subsequent operations that the dehydration be substantially complete. Preferably, I effect the dehydration by passing the gaseous mixture through silica gel. To the dehydrated gaseous mixture comprising hydrogen and a relatively small amount of carbon monoxide there is then added pure oxygen in an amount in excess of that theoretically required for the reaction $$2CO + O_2 = 2CO_2$$

say, an amount of oxygen double that theoretically required. The thus-obtained gaseous mixture, consisting of hydrogen, carbon monoxide and oxygen, is brought into contact with a suitable oxidation catalyst whereby to effect the above reaction. My preferred procedure involves bringing the said oxygen-containing-gaseous mixture to a temperature of from about 0° C. to about 100° C. and then intimately contacting it with a manganese dioxide catalytic mass prepared as follows: A quantity of finely ground potassium permanganate is introduced into an excess of nitric acid of 1.42 sp. gr. The violence of the reaction is controlled by cooling and stirring. When the reaction has ceased the resulting manganese dioxide is thoroughly washed, and then completely dehydrated. The manganese dioxide may be dehydrated on the porous plate which is to serve as the support of the catalytic mass; or, it may be dried in any other suitable manner with subsequent granulation or pulverization, and placed between porous plates or other suitable inert supports. The catalytic mass should be so disposed that the gases are brought into the most intimate possible contact therewith; cracks or channels through the mass minimize its efficiency.

At temperatures between 0° and 100° C. the amount of oxidized compounds in the said catalytic hydrogen is so small as to be inconsequential, if in fact any hydrogen does react with oxygen. The thus-obtained gaseous mixture consisting of hydrogen, carbon dioxide and free oxygen is then denuded of its free oxygen content by contacting the same with glowing copper in the known manner, and of its carbon dioxide content by contacting with a caustic alkali solution. The resulting product consists of hydrogen of a purity of about 99.8–99.9%.

I claim:

1. In processes for the production of hydrogen of great purity involving thermally decomposing hydrocarbon material and separating elemental carbon from the mixture of decomposition products comprising elemental carbon, hydrogen and relatively small amounts of aromatic hydrocarbons, methane type hydrocarbons and carbon monoxide, the combination of steps which consists in simultaneously separating aromatic hydrocarbons from said mixture and impregnating said mixture with water vapor by contacting the same with water, converting the methane type hydrocarbons content of the resulting water-impregnated mixture into carbon monoxide by subjecting said mixture to a thermal decomposition treatment at a temperature of from about 1230° to about 1280° C., drying the resulting mixture, admixing with the dried mixture oxygen in amount in excess of that theoretically required for the conversion of the carbon monoxide content thereof to carbon dioxide and converting said carbon monoxide content to carbon dioxide by intimately contacting the free oxygen-containing mixture with a manganese dioxide catalytic mass at a temperature below 100° C., removing unreacted oxygen from the resulting mixture by contacting the same with glowing copper, and separating the carbon dioxide content of the resulting mixture consisting of hydrogen and carbon dioxide by contacting said resulting mixture with caustic alkali solution.

2. In processes for the production of hydrogen of great purity, the combination of steps which consists in producing a hydrogen product of commercial purity by subjecting vaporized hydrocarbon material, under exclusion of oxygen and oxygen compounds to thermal decomposition treatment at temperatures up to about 1280° C., separating elemental carbon from the resulting mixture of decomposition products, intimately contacting the residual decomposition products with water and thereupon subjecting the same to thermal decomposition treatment at a temperature of from about 1230° to about 1280° C., drying the resulting product, admixing therewith oxygen in excess of that theoretically required for the conversion of the carbon monoxide content of said resulting product to carbon dioxide and intimately contacting the resulting free oxygen-containing product with a manganese dioxide catalytic mass at a temperature below 100° C., contacting the resulting product with glowing copper, and contacting the resulting product with caustic alkali solution.

3. In processes for the production of hydrogen of great purity, the combination of steps which consists in subjecting vaporized hydrocarbon material, under exclusion of oxygen and oxygen compounds, to thermal decomposition treatment by stages at an initial temperature of from about 1050° to about 1150° C., and at a final temperature of from about 1200° to about 1300° C., separating elemental carbon from the resulting mixture of decomposition products after each decomposition treatment, intimately contacting the residual decomposition products with water, and thereupon subjecting the same to thermal decomposition treatment at a temperature of from about 1230° to about 1280° C., drying the resulting product, admixing therewith oxygen in excess of that theoretically required for the conversion of the carbon monoxide content of said resulting product to carbon dioxide and intimately contacting the resulting free oxygen-containing product with a manganese dioxide catalytic mass at a temperature below 100° C., contacting the resulting product with glowing copper, and contacting the resulting product with caustic alkali solution.

In testimony whereof, I affix my signature.

ARTHUR W. BURWELL.